(12) United States Patent
Narum

(10) Patent No.: US 11,899,955 B2
(45) Date of Patent: Feb. 13, 2024

(54) MANAGING A MEMORY SUB-SYSTEM USING A CROSS-HATCH CURSOR

(71) Applicant: MICRON TECHNOLOGY, INC., Boise, ID (US)

(72) Inventor: Steven R Narum, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 17/836,595

(22) Filed: Jun. 9, 2022

(65) Prior Publication Data

US 2023/0400998 A1 Dec. 14, 2023

(51) Int. Cl.
*G06F 3/06* (2006.01)
(52) U.S. Cl.
CPC ............ *G06F 3/0644* (2013.01); *G06F 3/064* (2013.01); *G06F 3/0619* (2013.01); *G06F 3/0679* (2013.01)
(58) Field of Classification Search
CPC ...... G06F 3/0644; G06F 3/0619; G06F 3/064; G06F 3/0679
See application file for complete search history.

(56) References Cited

U.S. PATENT DOCUMENTS

| | | | | |
|---|---|---|---|---|
| 2015/0220385 | A1* | 8/2015 | Wood | G06F 3/061 714/6.24 |
| 2015/0355965 | A1* | 12/2015 | Peddle | G06F 11/1048 710/308 |
| 2017/0046081 | A1* | 2/2017 | Palmer | H04Q 9/00 |
| 2017/0269992 | A1* | 9/2017 | Bandic | G06F 11/1048 |
| 2020/0004670 | A1* | 1/2020 | Williams | G11C 16/0483 |
| 2020/0379903 | A1* | 12/2020 | Perlmutter | G06F 12/0253 |
| 2022/0083527 | A1* | 3/2022 | Todd | G06F 16/2282 |

* cited by examiner

*Primary Examiner* — Edward J Dudek, Jr.
(74) *Attorney, Agent, or Firm* — Lowenstein Sandler LLP

(57) ABSTRACT

One or more data items is received by a processing device managing one or more memory devices partitioned into a plurality of die partitions. The one or more data items is determined to be written sequentially to one or more blocks within a die partition of the plurality of die partitions. Metadata associated with the one or more data items is written sequentially to one or more blocks across the plurality of die partitions.

20 Claims, 5 Drawing Sheets

MANAGING A MEMORY SUB-SYSTEM USING A CROSS-HATCH CURSOR

TECHNICAL FIELD

Embodiments of the disclosure relate generally to memory sub-systems, and more specifically, relate to managing a memory sub-system using a cross-hatch cursor.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
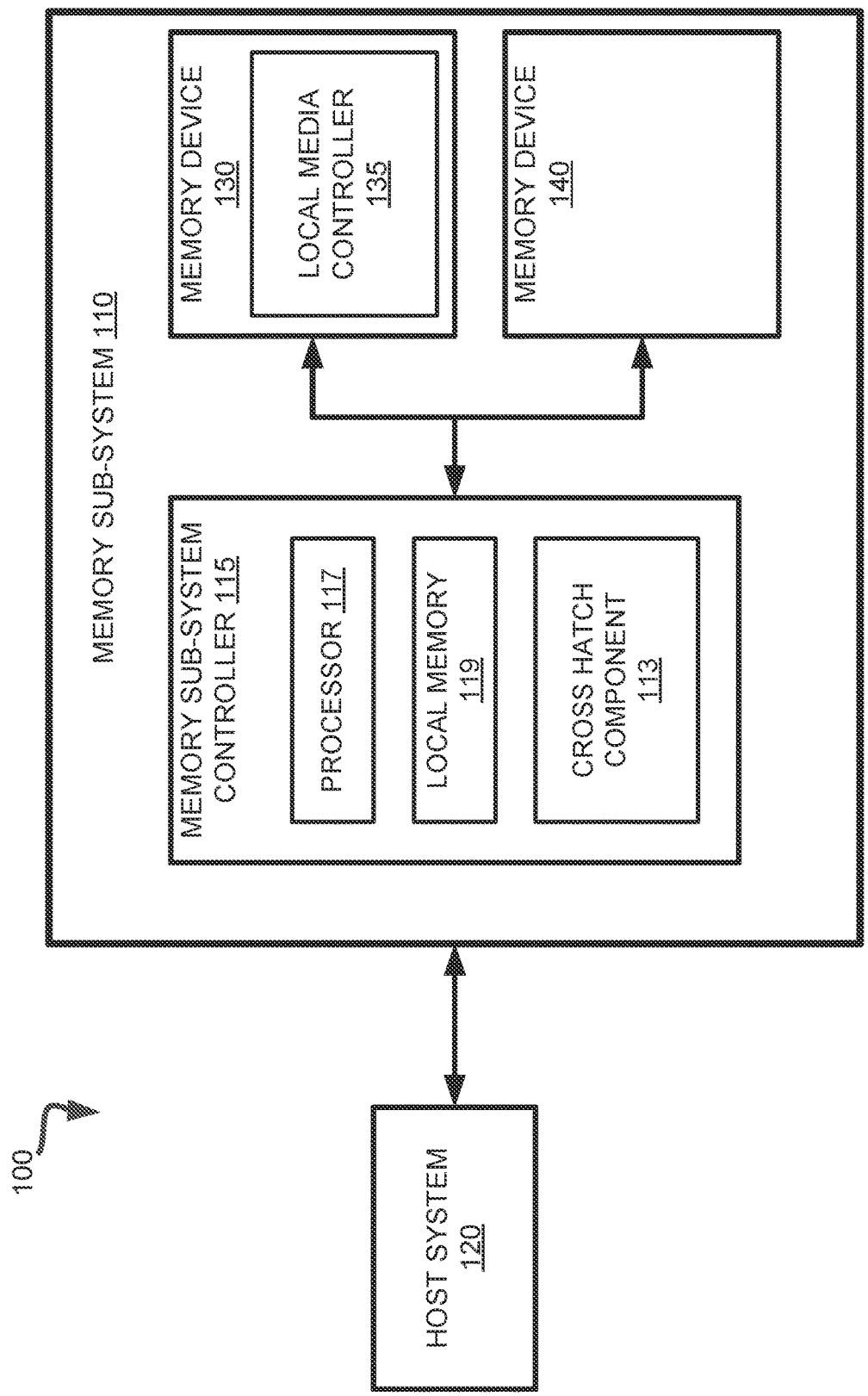
FIG. 1 illustrates an example computing system that includes a memory sub-system in accordance with some embodiments of the present disclosure.

Aspects of the present disclosure are directed to managing a memory sub-system using a cross-hatch cursor. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can include one or more memory planes ("planes"). For some types of non-volatile memory devices (e.g., NAND devices), each plane consists of a set of physical blocks ("blocks"). Each block consists of a set of pages. Each page consists of a set of memory cells ("cells").

A cell is an electronic circuit that stores information. Depending on the cell type, a cell can store one or more bits of binary information, and has various logic states that correlate to the number of bits being stored. The logic states can be represented by binary values, such as "0" and "1", or combinations of such values. Partitioning can refer to a process where memory is divided up into sections (e.g., partitions) for use by one or more applications, processes, operations, etc. A memory sub-system can be segmented into two or more partitions. A partition can be individually addressable and can contain information related to a specific application, process, operation, etc. A partition can be a logical separation of a memory sub-system that appears to the host system as multiple physical memory sub-systems.

A memory device can include multiple memory cells arranged in a two-dimensional or three-dimensional grid. Memory cells are etched onto a silicon wafer in an array of columns and rows. A memory device can further include conductive lines connected to respective ones of the memory cells, referred to as wordlines and bitlines. A wordline can refer to one or more rows of memory cells of the memory device and a bitline can refer to one or more columns of memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

The memory sub-system can use cursors to perform a memory operation, such as a write operation to write data from the host system to the memory sub-system. A cursor is an object which defines how to execute the memory operations on the memory device (i.e., how to iterate through the memory device). In other words, cursors are responsible for keeping track of when, where, or in what sequence an operation is to be performed on the memory devices. For example, the memory sub-system may utilize a cursor to iterate through a channel of the plurality of channels of the memory device for each memory operation associated with table data or data from the host system. Each channel of the plurality of channels is a physical communication path to communicate with an array of dies. Channels are independent and allow the memory sub-system controller to communicate with multiple dies at a time (e.g., one die per channel). Typically, multiple dies are connected to each channel and managed by the memory sub-system controller to send data to and/or from a single die at a time on each channel.

Thus, overtime with each memory operation associated with table data, the table data collectively may be properly spread out over the plurality of channels. However, based on memory operations associated with a specific portion of the table data, only the channel associated with the specific portion of the table data is impacted, thereby causing degradation in the quality of service of each channel unevenly. Table data e.g., FTL (flash translation layer) metadata mapping logical addresses (which are supplied by the host system) to physical addresses referencing memory device locations.

In another example, the memory sub-system may utilize the cursor to iterate across a plurality of channels of the memory device, rather than an individual channel of the plurality of channels, for each memory operation associated with table data or data from the host system. Typically, the table data and the data from the host system have similar sizes and format. However, since the table data is spread out across each channel of the plurality of channels similar to that of the data from the host system, all data operations are impacted equally.

Aspects of the present disclosure address the above and other deficiencies by having a memory sub-system that utilizes a cross-hatch cursor to execute memory operations with table data orthogonally to executing the memory operation with data from the host system. Cross-hatch cursor is an object which defines how to execute a first type of memory operations of the memory sub-system (i.e., how to iterate through the memory device for the first type of memory operation) in view of how the object defines how to execute a second type of memory operations of the memory sub-system (i.e, how the object iterates through the memory device for the second type of memory operation). Cross-hatch refers to the pattern that is created when the first type of memory operations are executed on the memory device with respect to when the second type of memory operations are executed on the memory device (e.g., orthogonal and/or perpendicular to one another). In particular, the cross-hatch cursor defines how to iterate through the plurality of channels to perform memory operations associated with table data based on how the cross-hatch cursor iterated through or is defined to iterate through the plurality of channels to perform memory operations associated with data from the host system.

In an exemplary embodiment, the cross-hatch component may iterate through a channel of the plurality of channels to perform memory operation associated with data from the host system and as a result the cross-hatch component iterates across the plurality of channels to perform memory operation associated with table data.

Advantages of the present disclosure include, but are not limited to dispersing overhead associated with performing memory operations with table data across each channel equally, thereby maintaining quality of service of all channels of the plurality of channels of the memory device (i.e., maintaining quality of service of each die partition of the memory device equally).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a cross-hatch cursor component 113 that can utilizes a cross-hatch cursor to execute memory operations associated with table data based on how the cross-hatch cursor is utilized to execute memory operations associated with data from the host system. Cross-hatch cursor is an object which defines how to execute the memory operations of the memory sub-system (i.e., how to iterate through the memory device. In some embodiments, the memory sub-system controller 115 includes at least a portion of the cross-hatch cursor component 113. In some embodiments, the cross-hatch cursor component 113 is part of the host system 110, an application, or an operating system. In other embodiments, local media controller 135 includes at least a portion of cross-hatch cursor component 113 and is configured to perform the functionality described herein.

The cross-hatch cursor component 113 can identify how to iterate through one or more memory devices (e.g., memory device 130 and/or 140) for metadata (e.g., flash translation layer (FTL) table data) associated with one or more data items from the host system 120 (e.g., host data) in a different direction than how the cross-hatch cursor component 113 iterates through the one or more memory devices for host data from the host system 120. FTL table data refers to data that is stored in a FTL mapping table used to translate logical address of memory access request, often referred to as logical block address (LBA), to corresponding physical memory addresses (e.g., physical location of the host data).

In particular, the memory device may include one or more dies partitioned into a plurality of die partitions and each die partition may include one or more channels. Each channel may include one or more memory blocks to store data. In some embodiments, the channel may be adjacently positioned within the die partition and each die partition of the plurality of die partitions may be adjacently positioned in relation to one another. Responsive to a memory access request (e.g., write or read), the cross-hatch cursor component 113 may be predefined to iterate through the memory device in a specific manner to execute the memory access operation. For example, when performing memory access operations (e.g., read operation or write operation) associated with host data, the cross-hatch cursor component 113 may be predefined to iterate one by one through each memory block of a channel of a die partition of the plurality of die partitions, thereby maintaining all the host data within a die partition of the plurality of die partitions. In other words, the cross-hatch cursor component 113 may be utilized to perform memory operations associated with host data by iterating through each memory block of a die partition without iterating into another die partition.

In view of the cross-hatch cursor component 113 being predefined to iterate one by one through each memory block of a channel of a die partition of the plurality of die partitions for host data, the cross-hatch cursor component 113 may be defined, for metadata, to iterate across the plurality of die partitions. For example, when performing memory access operations associated with metadata, the cross-hatch cursor component 113 may iterate through one or more memory blocks of each channel of a first die partition before proceeding to a subsequent die partition to iterate through the one or more within the subsequent die partition until the cross-hatch cursor component 113 reaches the last die partition of the plurality of die partitions. In other words, the cross-hatch cursor component 113 may be utilized to perform memory operations associated with metadata by iterating across each die partition of the plurality of die partitions (e.g., across each channel of the plurality of die partitions adjacently positioned with one another), thereby spreading the metadata across adjacently positioned die partitions.

Since the host data is written within a single die partition at a time and metadata corresponding to the host data is written across the plurality of die partitions, there is a risk that subsequent memory operations (e.g., write operations) associated with additional host data may overwrite metadata depending on the location in which the metadata was previously written and the host data is to be written. Accordingly, in some embodiments, the cross-hatch cursor component 113 may mark each portion of the die partition (e.g., a block of a channel of the die partition) that contain metadata as "bad blocks" to indicate that the portion of the die partition is not suitable for host data. Thus, the cross-hatch cursor component 113, during the writing and/or reading of host data, may skip any portion of the die partition originally designated for host data and write to/read from the next available portion of the die partition (e.g., a block of the channel of the die partition). The cross-hatch cursor component 113 may further perform other memory operations (e.g., read operations) on the host data and the metadata similar to how the cross-hatch cursor component 113 iterated through the die partition to perform an initial memory operation (e.g., write operation) with the host data and the metadata associated with the host data, respectively. Further details with regards to the operations of the cross-hatch cursor component 113 are described below.

Figure 2:
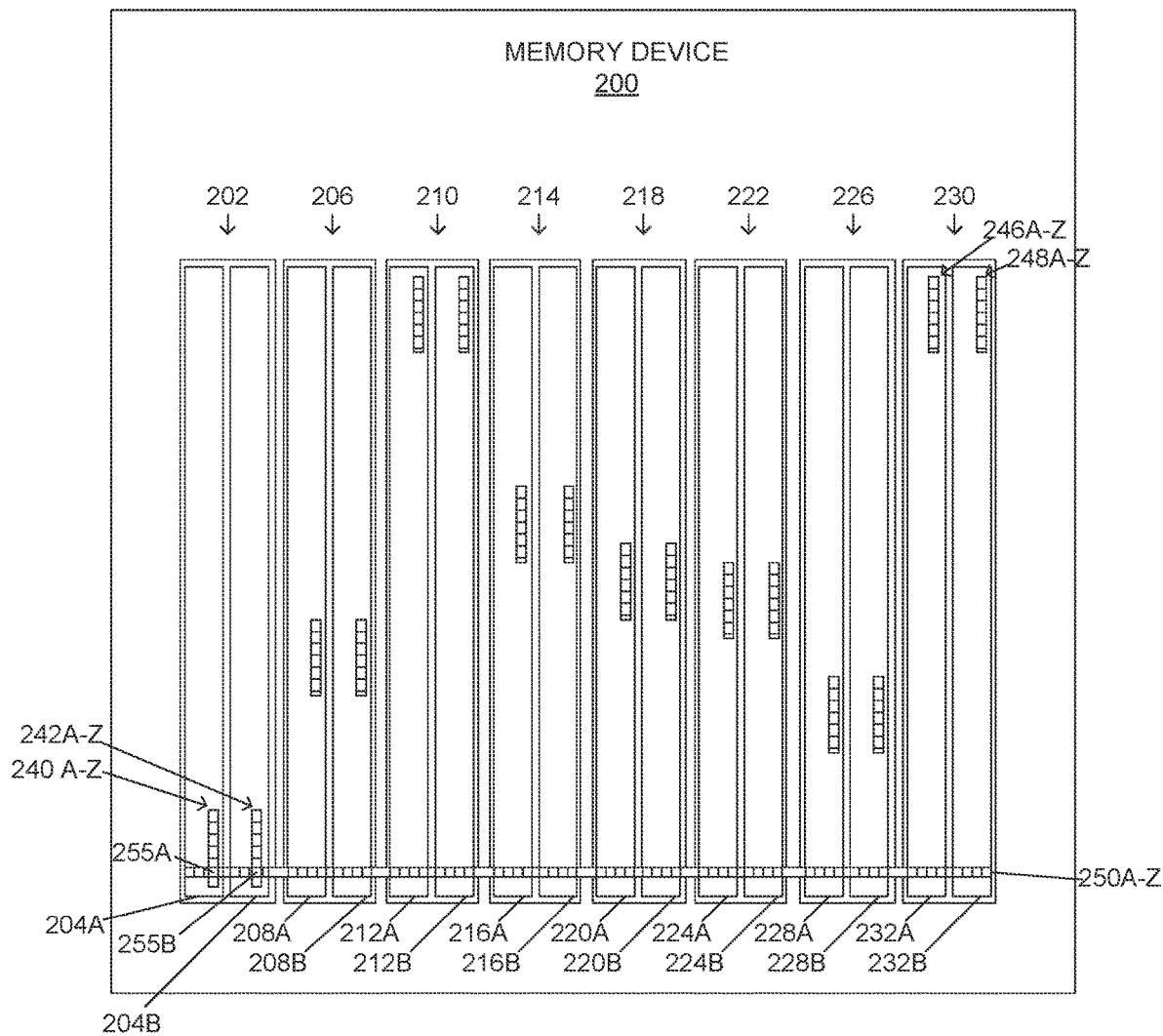
FIG. 2 illustrates a memory device of the memory sub-system with data cross-hatched in accordance with some embodiments of the present disclosure.

FIG. 2 illustrates an example of a memory device of the memory sub-system with data cross-hatched in accordance with some embodiments of the present disclosure. Memory device 200 may be similar to memory device 140 (of FIG. 1) and/or memory device 130 (of FIG. 1). In one embodiment, memory device 200 is partitioned into a plurality of die partitions 202, 206, 210, 214, 218, 222, 226, and 230 (e.g., the plurality of die partitions 202-230) (e.g., 8 die partitions). Each die partition of the plurality of die partitions 202-230 may include one or more channels. For example, die partition 202 may include channels 204A and 204B, die partition 206 may include channels 208A and 208B, die partition 210 may include channels 212A and 212B, die partition 214 may include channels 216A and 216B, die partition 218 may include channels 220A and 220B, die partition 222 may include channels 224A and 224B, die partition 226 may include channels 228A and 228B, and die partition 230 may include channels 232A and 232B.

The memory sub-system may receive host data (e.g., host data 240A-Z, host data 242A-Z, host data 246A-Z, and host data 248A-Z) from the host system to perform a memory operation (e.g., write operation) on the memory device 200 using the cross-hatch cursor component (e.g., cross-hatch cursor component 113 of FIG. 1). In particular, the memory sub-system may utilize the cross-hatch cursor component to perform the memory operation with host data (e.g., host data 240A-Z, host data 242A-Z, host data 246A-Z, and host data 248A-Z) on memory device 200 by iterating through a die partition of the plurality of die partitions. For example, the memory sub-system may utilize the cross-hatch cursor component to perform the memory operation with host data 246A-Z on memory device 200 by iterating through die partition 230 of the plurality of die partitions, more specifically through a channel of die partition 230 (e.g., channel 232A). As a result host data 246A-Z is fully contained within channel 232A of the die partition 230 of memory device 200.

Since the memory sub-system utilizing the cross-hatch cursor component to perform the memory operation with host data (e.g., host data 246A-Z and host data 248A-Z) by iterating through a single die partition of the plurality of die partitions (e.g., die partition 202, 206, 210, 214, 218, 222, 226, or 230), the memory sub-system may utilize the cross-hatch cursor component to perform the memory operation with metadata (e.g., 250A-Z) associated with host data (e.g., host data 240A-Z, host data 242A-Z, host data 246A-Z, and host data 248A-Z) by iterating across the plurality of die partitions (e.g., die partition 202, 206, 210, 214, 218, 222, 226, and 230), more specifically through each channel of each die partition of the plurality of die partitions (e.g., through channels 204A and B of die partition 202; channels 208A and B of die partition 206; channels 212A and B of die partition 210; channels 216A and B of die partition 214; channels 220A and B of die partition 218; channels 224A and B of die partition 222; channels 228A and B of die partition 226; and channels 232A and B of die partition 230). As a result metadata 250A-Z is spread out across the plurality of die partitions of memory device 200 (e.g., die partition 202, 206, 210, 214, 218, 222, 226, and 230).

As the memory sub-system receives additional host data (e.g., host data 240A-Z or host data 242A-Z) from the host system to perform a memory operation (e.g., write operation) on the memory device 200 using the cross-hatch cursor component, in some embodiments, the cross-hatch cursor component may iterate over a portion (e.g., one or more blocks) of the die partition (e.g., portion 255A of die partition 202 and portion 255B of die partition 206) that contains a portion of metadata 250A-Z, thereby causing the portion of metadata 250A-Z stored in the portion of the die partition (e.g., portion 255A of die partition 202 and portion 255B of die partition 206) to be overwritten. Accordingly, during an initial memory operation associated with the metadata 250A-Z, the cross-hatch cursor component may mark the portion of the die partition (e.g., portion 255A of die partition 202 and portion 255B of die partition 206) containing a portion of metadata 250A-Z or in other words one or more blocks of the die partition associated with blocks previously written or blocks to be written with metadata 250A-Z as "bad blocks" (i.e., invalid blocks for host data). Thus, the cross-hatch cursor component may skip over "bad blocks" when iterating through a die partition during a memory operation associated with host data to avoid overwriting metadata in the die partition. As a result, the cross-hatch cursor component skips over blocks identified as "bad blocks" and then continues performing memory operations with the host data to blocks not identified as "bad blocks."

For example, as the memory sub-system utilizes the cross-hatch cursor component to write host data 240A-Z, the cross-hatch cursor component starts to write a portion (e.g., host data 240A) of host data 240A-Z to channel 204A of die partition 202. Prior to performing each memory operation (e.g., write operation) with a portion (e.g., host data 240A) of the host data 240A-Z, the cross-hatch cursor component determines whether a current portion (e.g., a block of the channel) of the die partition is identified as a "bad block." If the current portion of the die partition is not identified as a "bad block," the memory sub-system performs the memory operation with the portion (e.g., host data 240A) of host data 240A-Z to the current portion of the die partition. Then the cross-hatch cursor component proceeds (e.g., iterates) to the next portion of the die partition to determine whether to allow the memory sub-system to write the next portion (e.g., host data 240B) of the host data 240A-Z at the next portion of the die partition. In the event that the cross-hatch cursor component identifies that the current portion of the die partition (e.g., portion 255A of channel 204A of die partition 202) is identified as a "bad block" due to containing a portion (e.g., metadata 250C) of metadata 250A-Z, the cross-hatch cursor component may skip over the current portion of the die partition without writing the current portion (e.g., host data 240F) of the host data 240A-Z. After skipping the current portion of the die partition (e.g., portion 255A of channel 204A of die partition 202) that is identified as a "bad block," the cross-hatch cursor component continues to the next portion of the die partition that is not identified as a "bad block" to write the current portion (e.g., host data 240F) of host data 240A-Z. The cross-hatch cursor component continues this process until the all portions of the host data 240A-Z is completely written to the die partition (e.g., the channel 204A of the die partition 202).

Similarly, as the memory sub-system receives memory access operations (e.g., read operation) on host data (e.g., host data 242A-Z), the memory sub-system may utilize the cross-hatch cursor component to iterate through a die partition (e.g., 202) including the host data (e.g., host data 242A-Z) starting from a starting point (e.g., a portion of the die partition containing host data 242A of host data 242A-Z) until an end point (e.g., a portion of the die partition containing host data 242Z of host data 242A-Z). As the cross-hatch cursor component to iterate through the die partition (e.g., channel 204B of die partition 202), the cross-hatch cursor component determines whether the portion of the die partition (e.g., block) is identified as a "bad block." If the cross-hatch cursor component determines that the portion of the die partition is not identified as a "bad block," the memory sub-system performs the memory access operation (e.g., read operation) and continues to a subsequent portion of the memory block to perform the memory access operation. However, if the cross-hatch cursor component determines that the portion (e.g., portion 255B) of the die partition (e.g., die partition 202) is identified as a "bad block," the cross-hatch cursor component skips the portion of the die partition (e.g., portion 255B of channel 204B of die partition 202) identified as a "bad block" and continues to a subsequent portion of the memory block to perform the memory access operation. The cross-hatch cursor component continues iterating through the die partition from the starting point to the end point identifying whether the current portion of the die partition is identified as a "bad block" or not to facilitate memory access operations on the die partition until the end point (e.g., host data 242Z of host data 242A-Z) is reached and the memory access operation is completed.

Figure 3:
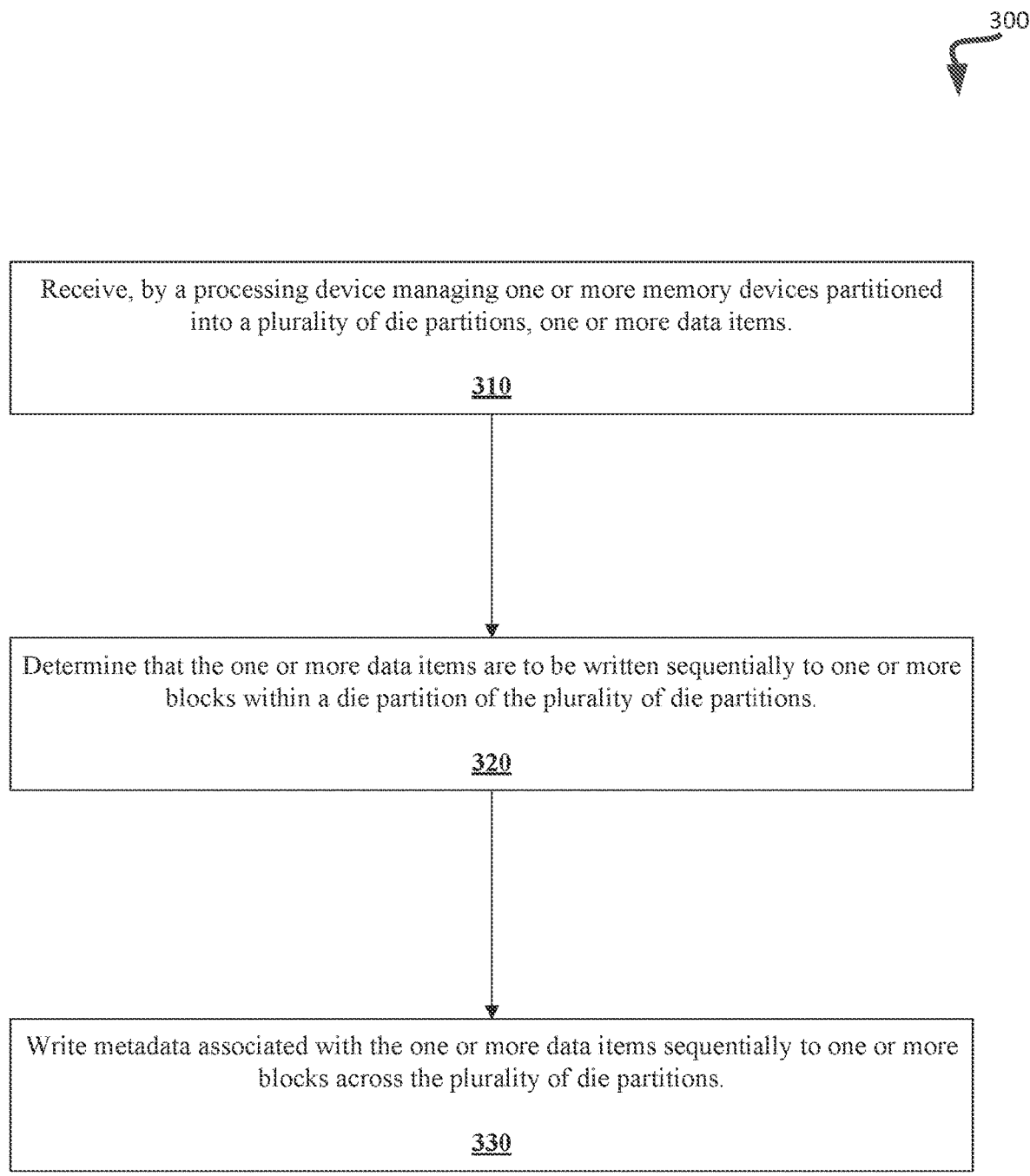
FIG. 3 is a flow diagram of an example method to manage a memory sub-system using a cross-hatch cursor in accordance with some embodiments of the present disclosure.

FIG. 3 is a flow diagram of an example method 300 to manage a memory sub-system using a cross-hatch cursor, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the cross-hatch cursor component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives one or more data items. The processing logic may manage one or more memory devices partitioned into a plurality of die partitions. At operation 320, the processing logic determines that the one or more data items are to be written sequentially to one or more blocks within a die partition of the plurality of die partitions. In some embodiments, receiving one or more data items includes causing the processing logic to write the one or more data items sequentially to one or more blocks within a die partition of the plurality of die partitions. In some embodiments, to write the one or more data items sequentially to one or more blocks within the die partition of the plurality of die partitions, the processing logic skips each block of the die partition that was previously written with data associated with the metadata. The processing logic, to write the one or more data items sequentially to one or more blocks within the die partition of the plurality of die partitions, writes to each block of the die partition of the plurality of die partitions that was not previously written with data associated with the metadata.

At operation 330, the processing logic writes metadata associated with the one or more data items sequentially to one or more blocks across the plurality of die partitions. In some embodiments, to write the metadata associated with the one or more data items sequentially to one or more blocks within the die partition of the plurality of die partitions, the processing logic marks each block in the plurality of die partitions as bad blocks. Bad blocks indicates each block that is skipped during writing the one or more data items due to the bad block containing metadata.

In some embodiments, the processing logic receives a request to read data associated with the one or more data items and reads the one or more data items sequentially from one or more blocks within the die partition. In some embodiments, the processing logic receives a request to read data associated with the metadata and reads the metadata sequentially from one or more blocks across the plurality of die partitions.

Figure 4:
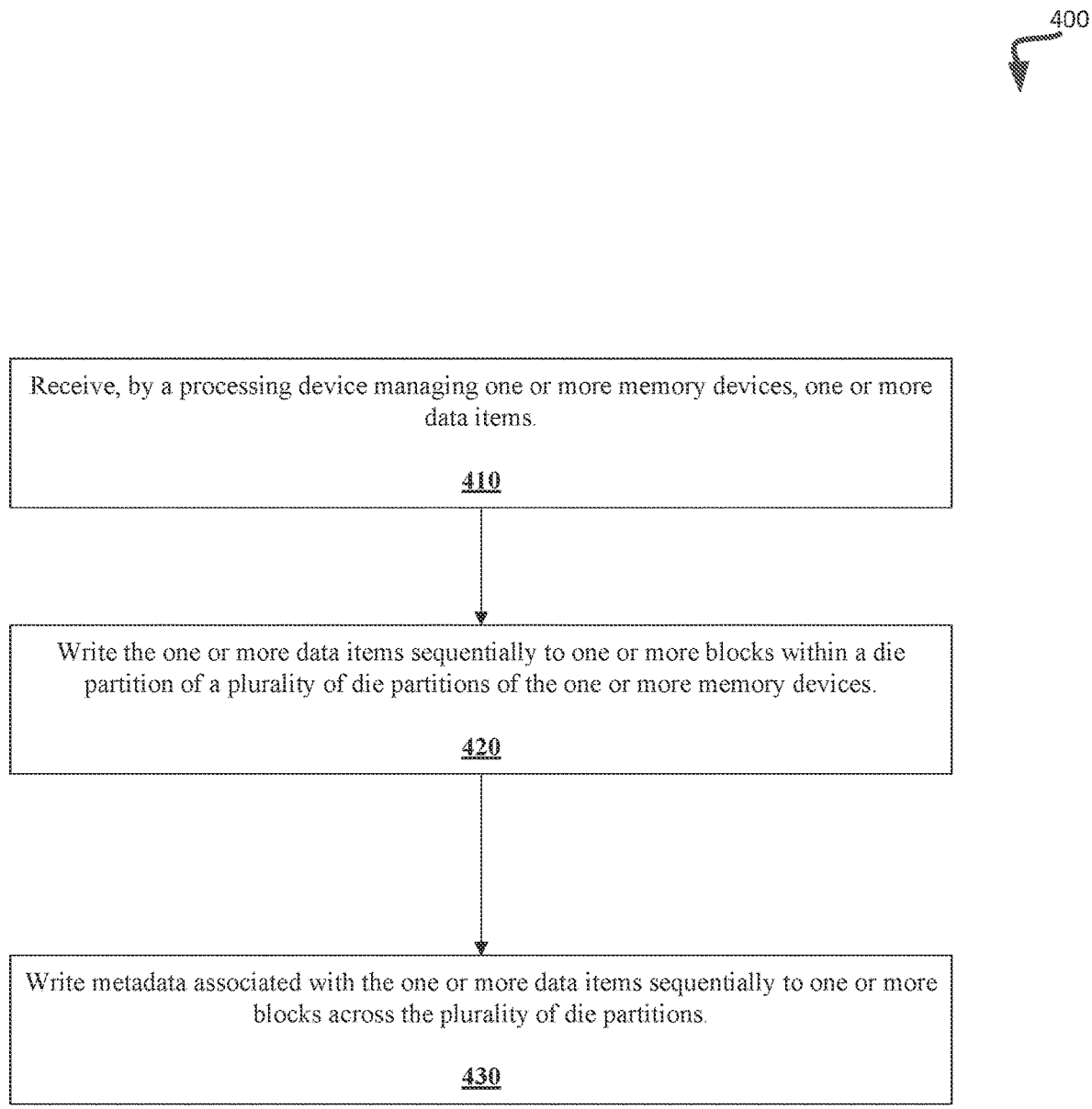
FIG. 4 is a flow diagram of an example method to manage a memory sub-system using a cross-hatch cursor in accordance with some embodiments of the present disclosure.

FIG. 4 is a flow diagram of an example method 400 to manage a memory sub-system using a cross-hatch cursor, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cross-hatch cursor component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives one or more data items. The processing logic manages one or more memory devices. At operation 420, the processing logic writes the one or more data items sequentially to one or more blocks within a die partition of a plurality of die partitions of the one or more memory devices. In some embodiments, to write writing the one or more data items sequentially to one or more blocks within the die partition, the processing logic skips each block of the die partition that was previously written with data associated with the metadata. In some embodiments, to write the one or more data items sequentially to one or more blocks within the die partition, the processing logic writes to each block of the die partition of the plurality of die partitions that was not previously written with data associated with the metadata.

At operation 430, the processing logic writes metadata associated with the one or more data items sequentially to one or more blocks across the plurality of die partitions. In some embodiments, to write metadata associated with the one or more data items sequentially to one or more blocks across the plurality of die partitions, the processing logic marks each block in the plurality of die partitions as bad blocks. Bad blocks indicates each block that is skipped during writing the one or more data items due to the bad block containing metadata.

In some embodiments, the processing logic receives a request to read data associated with the one or more data items and reads the one or more data items sequentially from one or more blocks within the die partition. In some embodiments, the processing logic receives a request to read data associated with the metadata and reads the metadata sequentially from one or more blocks across the plurality of die partitions.

Figure 5:
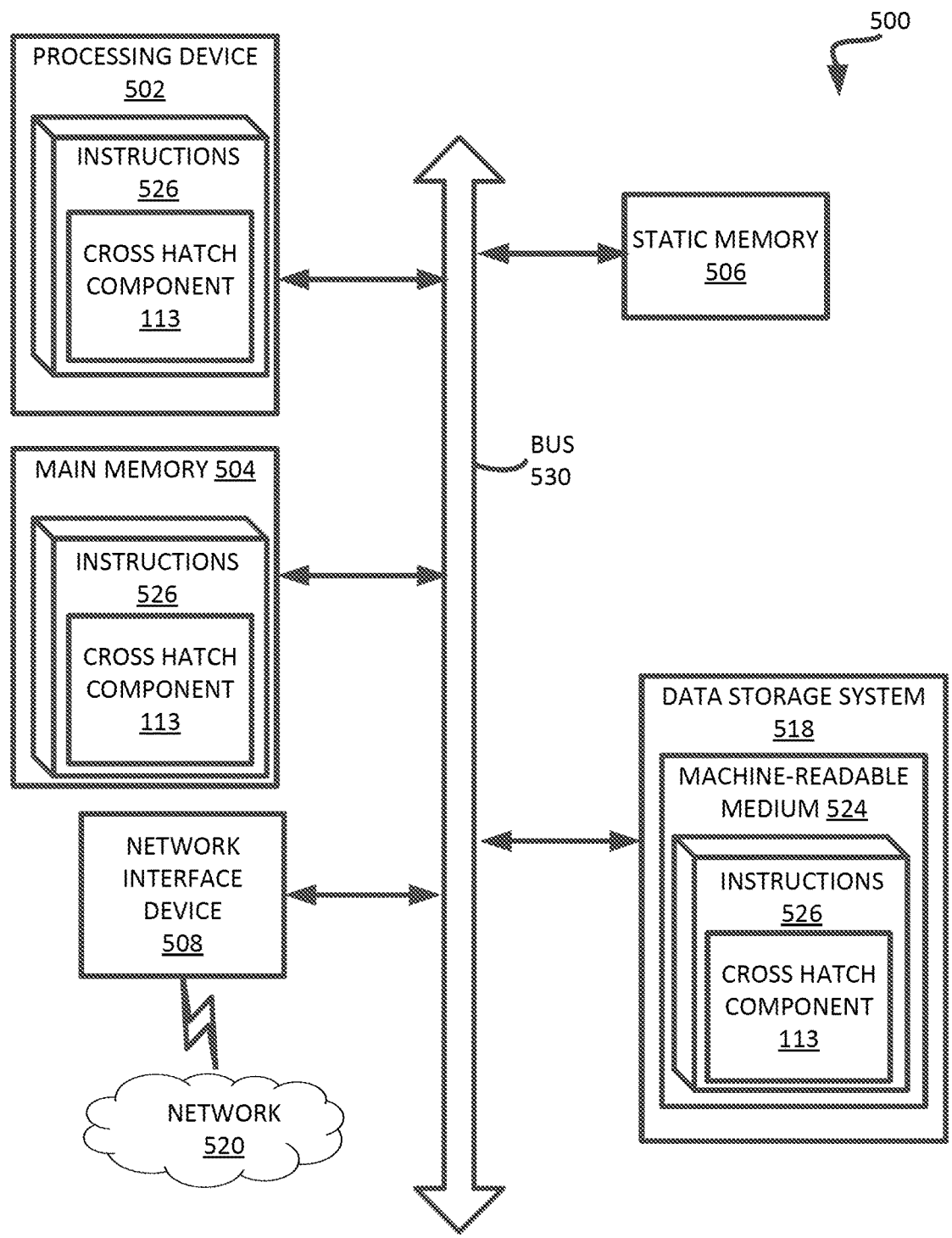
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the cross-hatch cursor component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a cross-hatch cursor component (e.g., the cross-hatch cursor component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, by a processing device managing one or more memory devices partitioned into a plurality of die partitions, one or more data items;
determining that the one or more data items are to be written sequentially to one or more blocks within a die partition of the plurality of die partitions; and
writing metadata associated with the one or more data items sequentially to one or more blocks across the plurality of die partitions.

2. The method of claim 1, wherein writing the metadata associated with the one or more data items sequentially to one or more blocks within the die partition of the plurality of die partitions includes marking each block in the plurality of die partitions as bad blocks.

3. The method of claim 2, wherein bad blocks indicates each block to be skipped during writing of the one or more data items.

4. The method of claim 1, wherein receiving one or more data items comprises:
writing the one or more data items sequentially to one or more blocks within a die partition of the plurality of die partitions.

5. The method of claim 4, wherein writing the one or more data items sequentially to one or more blocks within the die partition of the plurality of die partitions includes skipping each block of the die partition that was previously written with data associated with the metadata.

6. The method of claim 4, wherein writing the one or more data items sequentially to one or more blocks within the die partition of the plurality of die partitions includes writing to each block of the die partition of the plurality of die partitions that was not previously written with data associated with the metadata.

7. The method of claim 3, further comprising:
receiving a request to read data associated with the one or more data items; and
reading the one or more data items sequentially from one or more blocks within the die partition.

8. The method of claim 1, further comprising:
receiving a request to read data associated with the metadata; and
reading the metadata sequentially from one or more blocks across the plurality of die partitions.

9. A system comprising:
a memory device; and
a processing device coupled to the memory device, the processing device to perform operations comprising:
receiving one or more data items;
determining that the one or more data items are to be written sequentially to one or more blocks within a die partition of a plurality of die partitions of the memory device; and
writing metadata associated with the one or more data items sequentially to one or more blocks across the plurality of die partitions.

10. The system of claim 9, wherein writing the metadata associated with the one or more data items sequentially to one or more blocks within the die partition of the plurality of die partitions includes marking each block in the plurality of die partitions as bad blocks.

11. The system of claim 10, wherein bad blocks indicates each block that is skipped during writing the one or more data items.

12. The system of claim 9, wherein the processing device to further perform operations comprising:
writing the one or more data items sequentially to one or more blocks within a die partition of the plurality of die partitions.

13. The system of claim 12, wherein writing the one or more data items sequentially to one or more blocks within the die partition of the plurality of die partitions includes skipping each block of the die partition that was previously written with data associated with the metadata.

14. The system of claim 12, wherein writing the one or more data items sequentially to one or more blocks within the die partition of the plurality of die partitions includes writing to each block of the die partition of the plurality of die partitions that was not previously written with data associated with the metadata.

15. The system of claim 11, wherein the processing device to further perform operations comprising:
receiving a request to read data associated with the one or more data items; and
reading the one or more data items sequentially from one or more blocks within the die partition.

16. The system of claim 9, wherein the processing device to further perform operations comprising:
receiving a request to read data associated with the metadata; and
reading the metadata sequentially from one or more blocks across the plurality of die partitions.

17. A non-transitory computer-readable storage medium comprising instructions that, when executed by a processing device, cause the processing device to perform operations comprising:
receiving, by a processing device managing one or more memory devices, one or more data items;
writing the one or more data items sequentially to one or more blocks within a die partition of a plurality of die partitions of the one or more memory devices; and
writing metadata associated with the one or more data items sequentially to one or more blocks across the plurality of die partitions.

18. The non-transitory computer-readable storage medium of claim 17, wherein writing the one or more data items sequentially to one or more blocks within the die partition includes skipping each block of the die partition that was previously written with data associated with the metadata.

19. The non-transitory computer-readable storage medium of claim 17, wherein writing the one or more data items sequentially to one or more blocks within the die partition includes writing to each block of the die partition of the plurality of die partitions that was not previously written with data associated with the metadata.

20. The non-transitory computer-readable storage medium of claim 17, wherein writing metadata associated with the one or more data items sequentially to one or more blocks across the plurality of die partitions includes marking each block in the plurality of die partitions as bad blocks.

* * * * *